United States Patent
Luan et al.

(10) Patent No.: US 9,003,135 B2
(45) Date of Patent: Apr. 7, 2015

(54) EFFICIENT ALLOCATION AND RECLAMATION OF THIN-PROVISIONED STORAGE

(71) Applicant: International Business Machines Corporation, Armonk, NY (US)

(72) Inventors: Leo S. Luan, Saratoga, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 13/741,854

(22) Filed: Jan. 15, 2013

(65) Prior Publication Data
US 2014/0201491 A1    Jul. 17, 2014

(51) Int. Cl.
*G06F 12/00* (2006.01)
*G06F 12/02* (2006.01)

(52) U.S. Cl.
CPC .......... *G06F 12/0223* (2013.01); *G06F 12/023* (2013.01)

(58) Field of Classification Search
USPC ....................................................... 711/158
See application file for complete search history.

(56) References Cited

U.S. PATENT DOCUMENTS

| | | | |
|---|---|---|---|
| 7,603,532 B2 | 10/2009 | Rajan et al. | |
| 7,949,637 B1 | 5/2011 | Burke | |
| 8,140,821 B1 | 3/2012 | Raizen et al. | |
| 8,156,306 B1 | 4/2012 | Raizen et al. | |
| 2009/0300301 A1 | 12/2009 | Vaghani | |
| 2010/0241820 A1* | 9/2010 | Pelts et al. | 711/170 |
| 2010/0262802 A1 | 10/2010 | Goebel et al. | |
| 2012/0054746 A1 | 3/2012 | Vaghani et al. | |

* cited by examiner

*Primary Examiner* — Duc Doan
(74) *Attorney, Agent, or Firm* — Lieberman & Brandsdorfer, LLC (57) ABSTRACT

Embodiments of the inventions relate to granular management of data storage blocks in a data storage system. In one aspect, status values are employed to track "used", "free", and "claimed free" storage blocks. A storage block having stored data is identified as used, a storage block available to store data is identified as free, and a storage block having previously stored data removed that has not been reclaimed is identified as claimed free. These values are maintained on a map to track each data block within the data storage system. Available claimed free data blocks are prioritized for data block allocation over available free data blocks for efficient storage, including enabling efficient reclamation of data blocks and minimizing data movement needed for reclamation-oriented de-fragmentation.

12 Claims, 9 Drawing Sheets

EFFICIENT ALLOCATION AND RECLAMATION OF THIN-PROVISIONED STORAGE

BACKGROUND

This invention is related to efficient management of data storage blocks of thin-provisioned storage that uses virtualization technology to give the appearance of having more storage space than is actually available. More specifically, status values are employed to facilitate granular management of the data storage blocks, including both allocation and reclamation of data storage blocks to achieve higher efficiency when using thin-provisioned storage.

In data management, a data storage block is a group of storage bytes on a storage device that are manipulated as units. The size of a storage block is typically 512 bytes, although the size can vary. Storage is typically assigned as logical disks (or volumes). Each logical disk has a size. Blocks within a logical disk are accessed through a logical block address (LBA) within the containing logical disk. Traditional storage devices pre-allocate physical space to a logical disk for all of its blocks. This can be wasteful because the application using this logical disk may not actually write data to many or even most of the blocks within the logical disk, or does so only after a long period of time. To address this inefficiency, thin-provisioning storage devices allocate a storage block only when data is written to its corresponding logical block address. Such allocation is usually done in a larger unit, e.g. greater than a data block, known as partition, although other terms may be used by different storage products, whose size can vary from hundreds of kilobytes to gigabytes of storage space. The physical space of all blocks of a partition is allocated when any block within the partition is written.

Once a partition on the storage controller is allocated physical space, the allocated space remains allocated until the data storage system informs the storage controller that all the blocks within the partition can be reclaimed. State-of-the-art data storage systems do not identify free blocks that already have claimed space. Free data blocks that contain claimed space are indistinguishable from free data blocks that contain no claimed space according to the storage controller. Free blocks with claimed space can remain unused while other free data blocks without claimed space become used, causing extra physical storage to be allocated.

BRIEF SUMMARY

This invention comprises a system and computer program product for granular management of storage block allocation.

In one aspect, a map is maintained for tracking status values for data blocks within the data storage system. Each block has a status value in the map. The status value identifies the allocation status of the data block. The status value is either "used", "free", or "claimed free". A "used" block value identifies a data block with stored data. A "free" block value identifies a data block available to store data that does not have claimed space on the storage device. A "claimed free" block value identifies a data block previously used to store data that has claimed space on the storage device, but can be reused to store new data, because the previously written data have since been deleted. A write transaction requiring one or more data storage blocks is satisfied with a block having a status value of claimed free or free. More specifically, the block allocation map is searched for blocks with status value claimed free or free and the block allocation is prioritized based on the status. If a block with a claimed free status value is available, this block is used to satisfy the transaction otherwise the transaction is satisfied with a data block having a free status value.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

It is understood that a data block is a contiguous set of bits or bytes that form an identifiable unit of data. Each data block is provided with a status value, which may change based on the characteristic of the data block. The status values include: used, free, and claimed free. A used status value is assigned to a data block that is currently in use and has claimed space on the storage controller. A free status value is assigned to a data block that is not currently in use, and has no claimed space on the storage controller, also known as a free data block. A claimed free status value is assigned to a data block that is not currently in use, but has claimed space on the storage controller. Both a free status value and a claimed free status value refer to data blocks available to receive data for storage. The advantage of using claimed free blocks is that it does not necessitate the allocation of additional physical space on the storage controller. A data block that is marked with an allocation status different from the allocation status previously marked to that data block takes on the newly marked allocation status. Accordingly, the status value characterizes the data blocks and their availability to support a write transaction.

It is understood that a data partition is an allocation unit of a storage controller. A data partition is comprised of one or more data blocks. Each data block in a data partition has a status value as described above.

Figure 1:
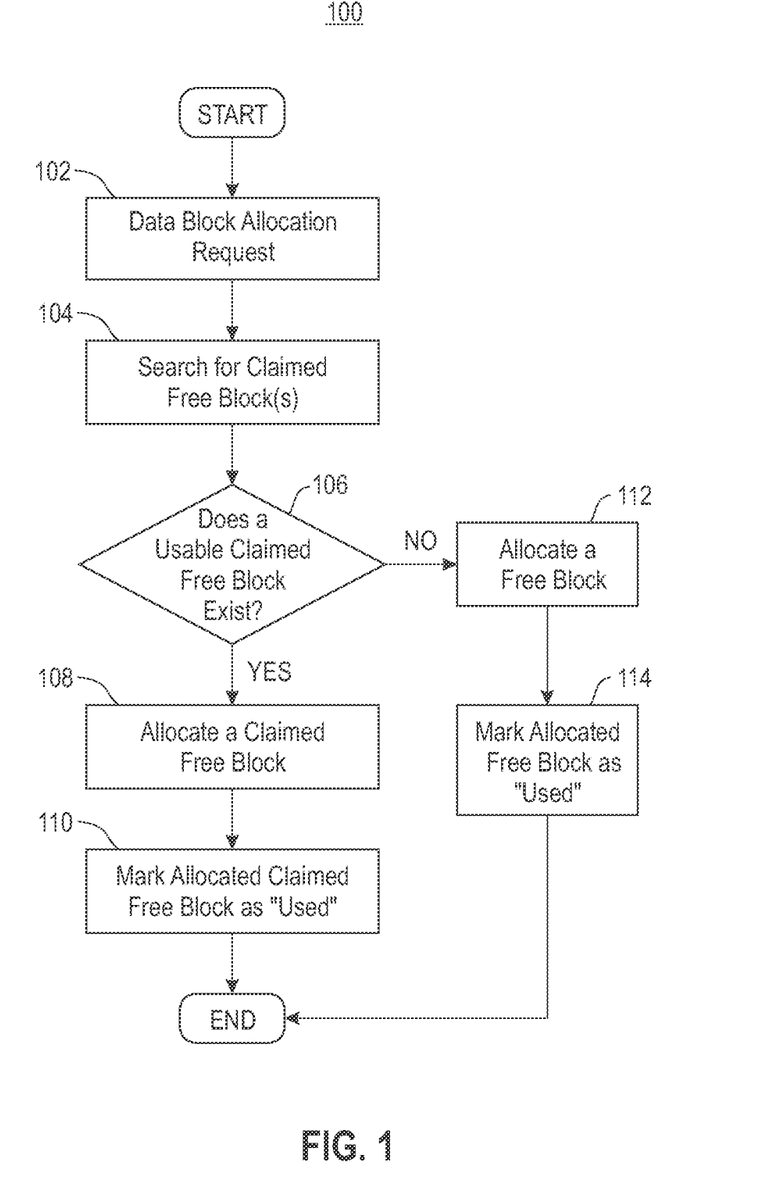
FIG. 1 depicts a flow chart illustrating a method for allocating a data block.

FIG. 1 is a flow chart (100) illustrating a method for allocating data to an available data block. A data block allocation is requested (102) in response to a transaction requiring data to be stored on data storage. In one embodiment, the request for the data block allocation is in response to a write transaction. For the purpose of satisfying the data block allocation request, a search is initially conducted for a claimed free block to satisfy the transaction (104). In one embodiment, the search for one or more claimed free blocks includes at least as much available storage space as is required to satisfy the transaction, also referred to herein as a data block allocation request. Following the search at step (104), it is determined if a claimed free block is available to satisfy the transaction (106). A positive response to the determination at step (106) is followed by allocating a claimed free data block to satisfy the transaction (108). Upon allocation of the claimed free block, the claimed free block ceases to be available for additional storage, and the status value of the storage block is changed from "claimed free" to "used" (110). A negative response to the determination at step (106) is followed by allocating a free block to satisfy the transaction (112). Upon allocation of the free block, the free block ceases to be available for additional storage. The status value of the free block is changed from "free" to "used" (114). Accordingly, claimed free data blocks are prioritized over free data blocks for a block allocation request for more efficient storage.

Figure 2:
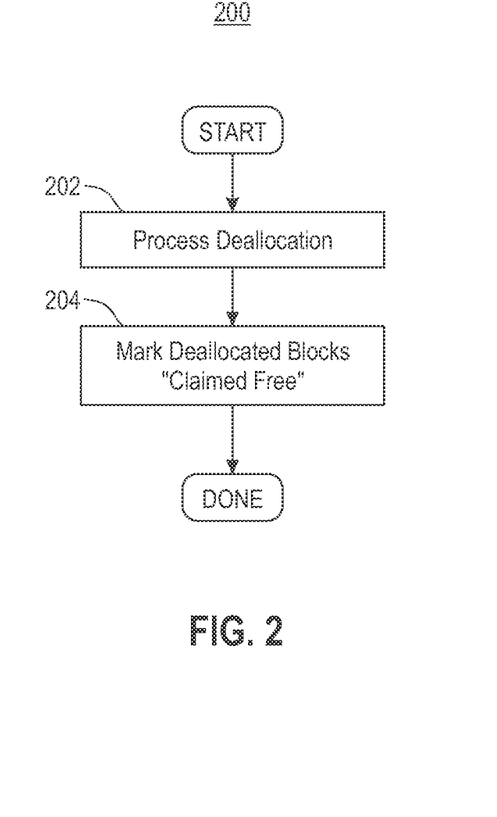
FIG. 2 depicts a flow chart illustrating a method for de-allocating a data block.

The status value of a data block not only changes with the block allocation as demonstrated in FIG. 1, but with the block de-allocation as well. FIG. 2 is a flow chart (200) illustrating a method for block de-allocating, wherein the status of the block is changed from "used" to "claimed free". To process the de-allocation (202), the blocks that are subject to the de-allocation are marked "claimed free" (204). Accordingly, the process of block de-allocation pertains to changing the status of the block(s).

Figure 3:
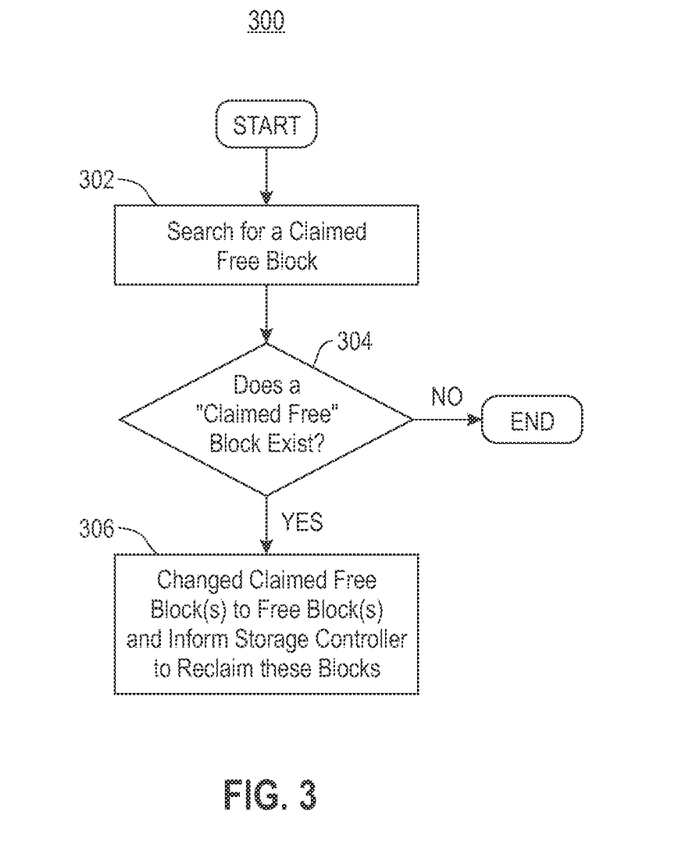
FIG. 3 depicts a flow chart illustrating a method for storage reclamation.

The physical storage space allocated by the storage controller to claimed free blocks can be reclaimed through a storage reclamation process. FIG. 3 is a flow chart (300) illustrating a method for re-claiming data blocks designated as claimed free blocks. This storage reclamation process may be performed in several different manners, including but not limited to, periodically, threshold-driven, or command-driven. In one embodiment, threshold-driven reclamation may be triggered when a certain amount of claimed free space has accumulated, or when the storage controller has a set amount of free space left. A search is initiated for a claimed free block within data storage (302), and it is determined if a claimed free block exists (304). A negative response is followed by a termination of the search or a repeated search. However, a positive response is followed by changing the claimed free block(s) to free block(s) and informing the storage controller to reclaim the physical space used by these block(s) (306). In one embodiment, the status change at step (306) may include more than one claimed free block. Accordingly, storage reclamation changes the status value of claimed free block(s) to free.

Figure 4:
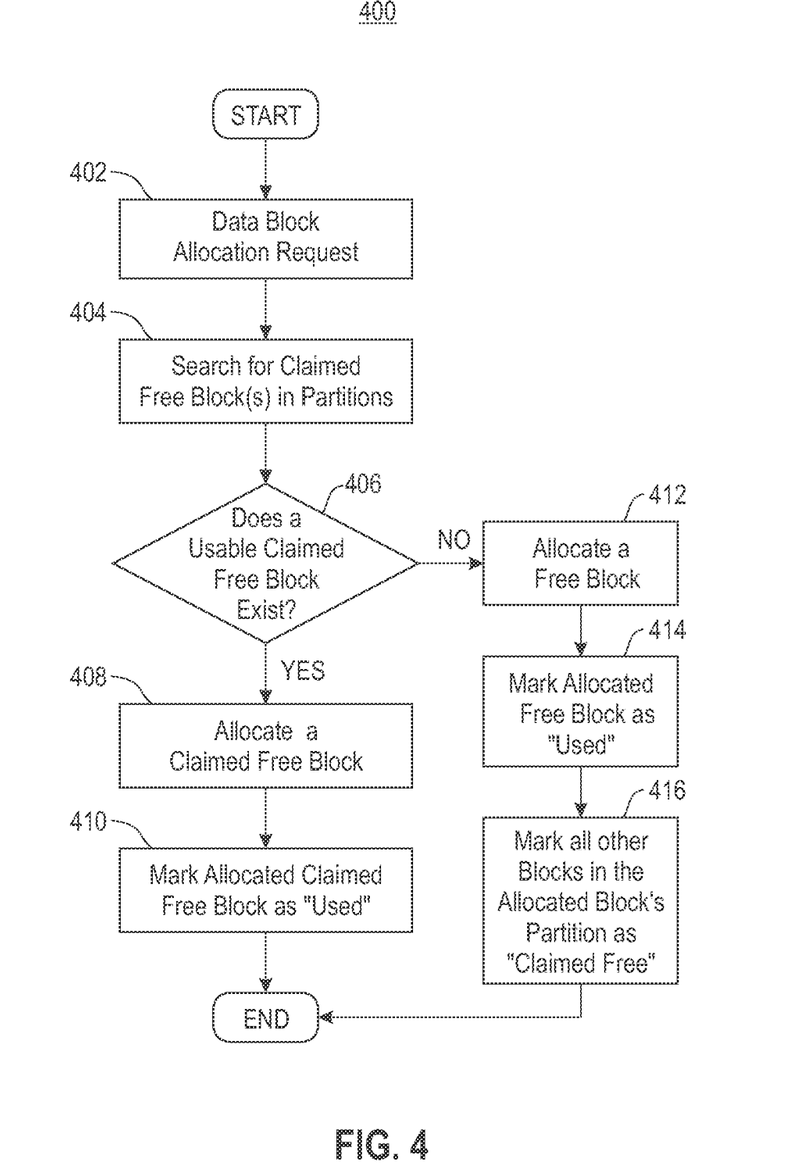
FIG. 4 depicts a flow chart illustrating a method for partition-aware data block allocation.

Data blocks are granular units of storage within a data storage unit. On a storage controller, data blocks may be grouped into larger storage allocation units known as data partitions. The aspect of data storage block status value may be extended to the data partition. FIG. 4 is a flow chart (400) illustrating a method for allocating data blocks responsive to a storage organization of data blocks into data partitions. In response to a data block allocation request (402), a search is conducted for a claimed free block(s) sufficient to store the requested data (404). Following the search at step (404), it is determined if a usable claimed free block exists (406). A positive response to step (406) is followed by allocating the claimed free block (408), and changing the status value of the claimed free block from "claimed free" to "used" (410). A negative response to step (406) is followed by allocating an available free block (412), and subsequent to the allocation, changing the status of the free block from "free" to "used" (414). Following the status value change at step (414), all other free blocks in the same partition as the block allocated in step (414) are marked as "claimed free" (416). The prioritization of allocating a claimed free block over a free block creates more efficient storage as the growth of storage allocation in a storage controller is minimized. In the event a free block is not available, the controller is employed to allocate one or more additional free blocks to satisfy the transaction. Accordingly, claimed free data blocks are prioritized over free data blocks for data allocation, and a partition containing any used block has all free blocks changed to claimed free blocks.

Figure 5:
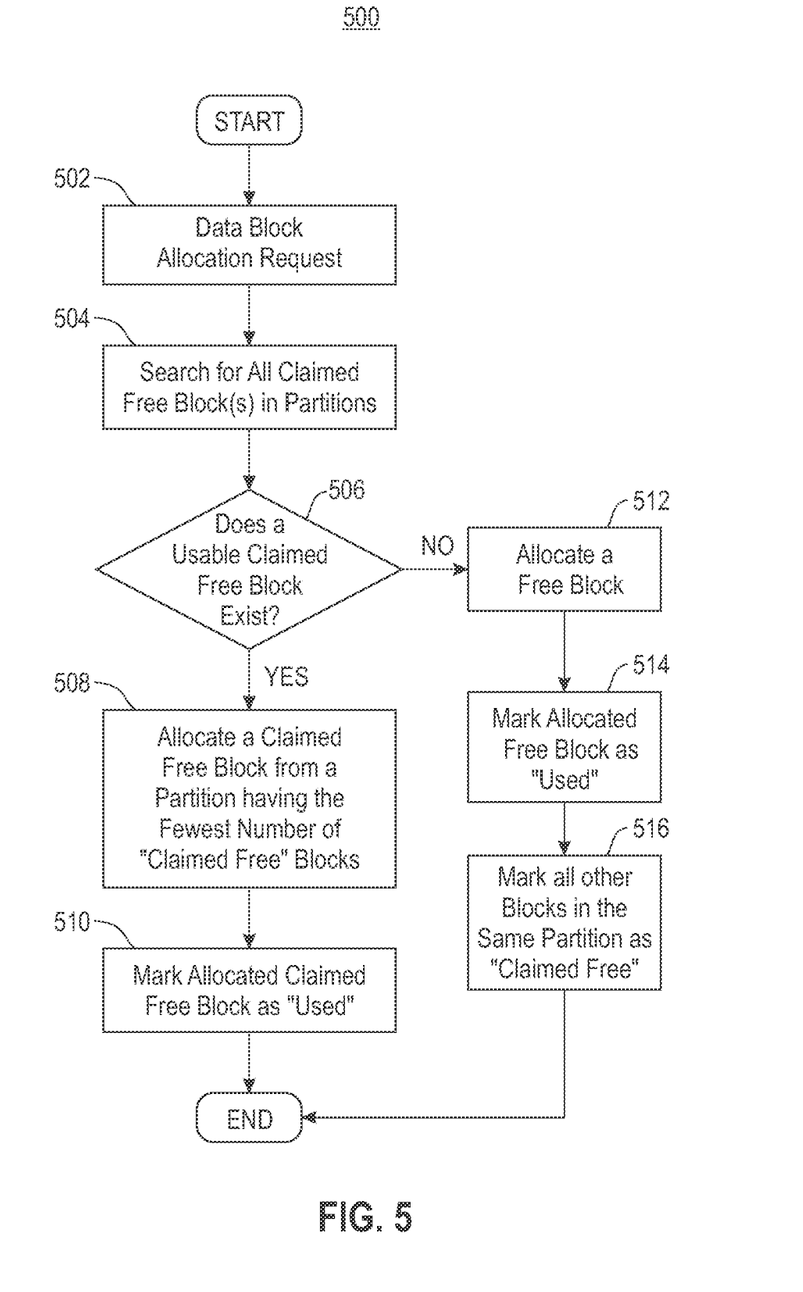
FIG. 5 depicts a flow chart illustrating a method for the optimization of partition-aware data block allocation.

FIG. 5 is a flow chart (500) illustrating a method for optimizing the allocating of data blocks responsive to a storage organization of data partitions. FIG. 5 is provided with all elements of FIG. 4 incorporated therewith. In response to a data block allocation request (502), a search is employed to ascertain all available claimed free blocks within data partitions sufficient to satisfy the block allocation request (504). If at least one usable claimed free block exists, then a claimed free block is allocated from a found data partition having the fewest number of claimed free blocks more than one (508), and the status value of the claimed free block is changed from "claimed free" to "used" (510). A negative response to step (506) is followed by allocating an available free block within a data partition (512), and subsequent to the allocation, changing the status of the free block from "free" to "used" (514). Following the status value change at step (514), all other blocks in the same partition of the allocated block(s) are marked as "claimed free" (516). In one embodiment the claimed free partition having the fewest number of claimed free blocks is found through an index maintained to track a quantity of free blocks in each data partition. The index enables prioritizing allocation of blocks within a data partition. This ensures that partitions containing data and having claimed free blocks are filled more readily and remaining claimed free blocks are collocated within fewer partitions. Accordingly, data is efficiently stored in response to a data allocation request by filling data blocks in partitions having the least number of claimed free blocks.

Figure 6:
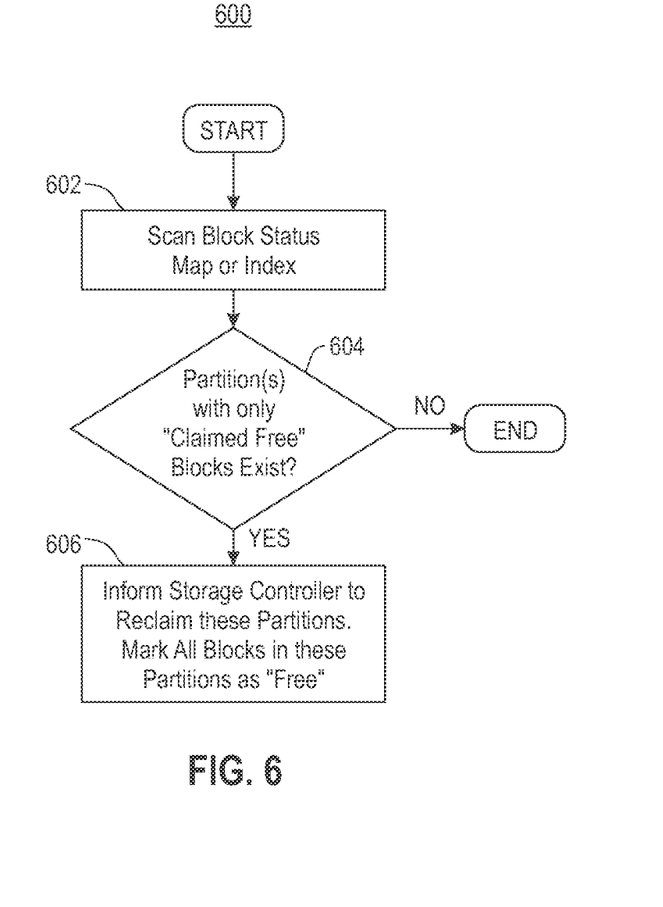
FIG. 6 depicts a flow chart illustrating a method for partition-aware storage reclamation.

FIG. 6 is a flow chart (600) illustrating a method for re-claiming claimed free blocks in data storage organized in data partitions. A scan is conducted of a block status map or index for a data partition having only claimed free blocks (602). It is determined if any of the designated data partitions satisfy the condition of the search (604). In one embodiment, the condition at step (604) is a partition with only claimed free blocks. A negative response is followed by a termination of the method. However, a positive response is followed by informing the storage controller to reclaim these partitions and mark all blocks in these partitions as free blocks (606). Accordingly, a data partition ascertained to only contain claimed free blocks is re-claimed by changing the status value of all claimed free blocks in the data partition to free blocks.

Figure 7:
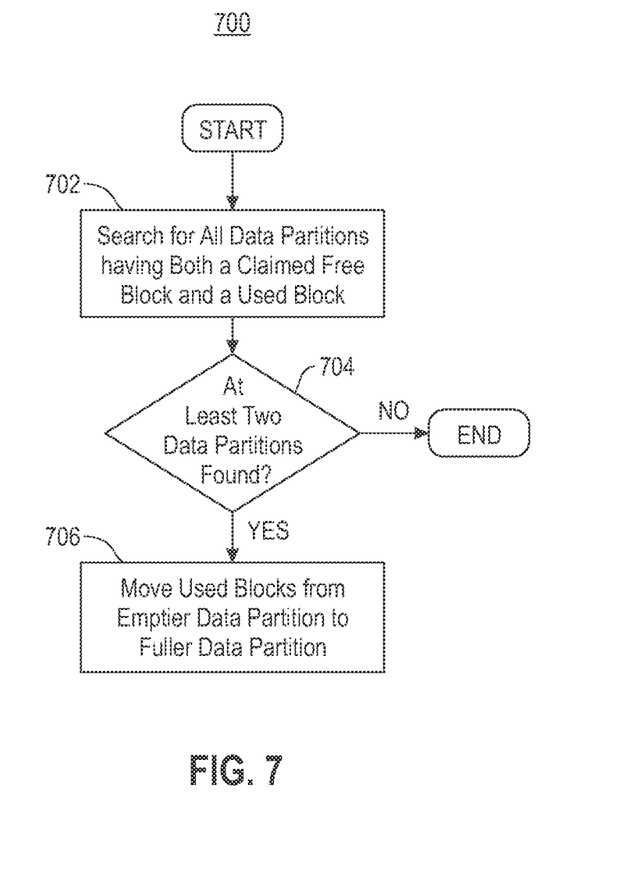
FIG. 7 depicts a flow chart illustrating a method for the optimization of partition-aware defragmentation of storage.

FIG. 7 is a flow chart (700) illustrating a method for rearranging allocation of data blocks to reduce the total number of data partitions containing used blocks. This process is referred to herein as defragmentation. A search is employed for all data partitions having both at least one claimed free block and at least one used block (702). It is determined if at least two data partitions meeting this criteria are found (704). A negative response is followed by determination that no defragmentation is necessary and the method is terminated. A positive response is followed by moving used blocks from an emptier data partition to a more full data partition (706). A data partition is considered emptier if the data partition contains fewer used blocks than does a more full data partition. Accordingly, the amount of partially used data partitions in storage is minimized through the process of partition-optimized defragmentation in which used blocks from emptier data partitions are moved to one or more fuller data partitions. As a result, some partitions may become completely empty, that is, all data blocks within the partition have a status value of claimed free. These partitions can then be reclaimed either immediately or during the next reclaim scan according to FIG. 6.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
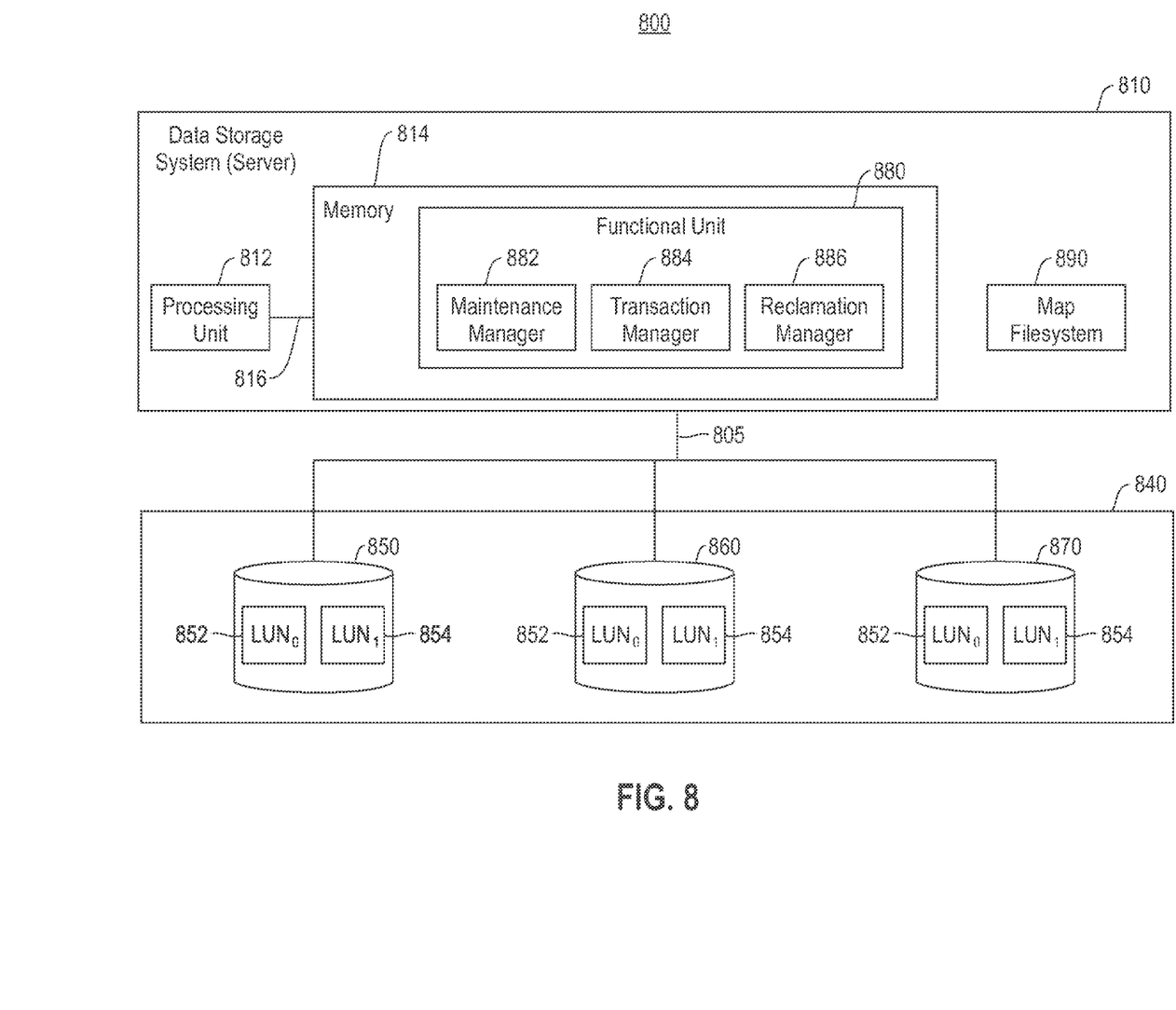
FIG. 8 depicts a block diagram illustrating tools embedded in a computer system to support efficient allocation and reclamation of storage.

As shown in FIGS. 1-7, a method is provided to manage allocation and reclamation of data storage blocks within a data storage system. Efficiency of allocation is improved by identifying and utilizing data storage blocks with a status value reflecting a previously used data storage blocks that is available to support a write transaction. Referring now to FIG. 8 is a block diagram (800) illustrating a system having tools to support efficient allocation and reclamation of data storage blocks.

A data storage system (810) runs on one or more servers that includes a processing unit (812) in communication with memory (814) across a bus (816). The data storage system is in communication with one or more storage controllers (840) across a bus or network (805). While one storage controller is shown (840), any number of storage controllers may be used by the data storage system (810). The storage controller(s) may or may not run on the same server(s) where the data storage system runs. In this example, the storage controller (840) contains three physical disks (850), (860) and (870) and configures them into two logical volumes, with logical unit number $LUN_0$ and $LUN_1$. While the storage controller is shown to have two logical volumes, the invention should not be limited to the number of logical volumes shown herein. Depending on the storage workload and the virtualization technology used, each of the physical disks may or may not contain some part(s) of the configured logical volumes.

An allocation map (890) is provided in the system local to the data storage system (810), to track the allocation status of data storage blocks. In one embodiment, a separate allocation map is maintained for each supported filesystem. In the example, shown herein, the data storage supports a single filesystem, and the allocation map (890) is maintained for this file system.

A functional unit (880) is provided local to the data storage system (810) to support allocation and reclamation of data storage blocks in storage controller (840), and in communication with processing unit (812). The functional unit (880) is provided with tools for management of data storage blocks, the tools including: a maintenance manager (882), a transaction manager (884), and in one embodiment, a reclamation manager (886). The maintenance manager (882) maintains the allocation map for tracking status value of data storage blocks in data storage system (840). In one embodiment, the maintenance manager (882) organizes two or more data blocks into a data partition, and maintains the status value of each data block within the data partition. In one embodiment, the maintenance manager (882), in response to changing the status of a block in a partition from free to used, changes the status of all other free blocks within the partition to claimed free. In another embodiment, the maintenance manager (882) allocates claimed free blocks from data partitions. Accordingly, the maintenance manager (882) maintains the allocation map (890) to track the status value of a data block, and change the status value of the data block under limited circumstances.

The transaction manager (884) is provided in communication with the maintenance manager (882), and functions to satisfy a write transaction requiring one or more data storage blocks. More specifically, the transaction manager (884) searches the allocation map (890) maintained by the maintenance manager (882) for a block to satisfy the write transaction. In one embodiment, the transaction manager (884) searches for a claimed free block, and in the event a claimed free block is not found a search is conducted for a free block. The transaction manager (884) further satisfies the write transaction with the found block. In one embodiment, the maintenance manager (882) creates an index for tracking a quantity of free blocks in a data partition and the transaction manager (884) prioritizes the allocation of blocks identified in the index with the smallest quantity of claimed free blocks provided in the data partition. Accordingly, the transaction manager (884) is provided to search for and allocate data block(s) in response to a write transaction.

In one embodiment, a reclamation manager (886) is provided in communication with the maintenance manager (882). The reclamation manager (886) reclaims a claimed free block, including the reclamation manager (886) to identify the claimed free block, inform the storage controller (840) to reclaim the identified block, and change the status value of the identified block to free. This change is recorded by the maintenance manager (882) within the allocation map (890). In one embodiment, the reclamation manager (886) reclaims data blocks only when a data partition containing only claimed free blocks is identified. In this embodiment, the reclamation manager (886) changes the status value of all claimed free blocks in the data partition to free blocks and this change is recorded by the maintenance manager (882) within the allocation map (890). Accordingly, the reclamation manager (886) changes claimed free blocks to free blocks in the instances described above in order to reclaim free space in data storage.

As identified above, the maintenance manager (882), transaction manager (884), and reclamation manager (886), hereinafter referred to as tools, function as elements to support autonomous classification of textual data. The tools (882)-(886) are shown residing in memory (814) local to the data storage system (810) and in communication with the storage controller (840). However, the tools (882)-(886) may reside as hardware tools external to the memory (814), or they may be implemented as a combination of hardware and software. Similarly, in one embodiment, the tools (882)-(886) may be combined into a single functional item that incorporates the functionality of the separate items. As shown herein, each of the tools (882)-(886) are shown local to the data storage system (810). However, in one embodiment they may be collectively or individually distributed across a network or multiple machines and function as a unit to autonomously classify textual data. Accordingly, the tools may be implemented as software tools, hardware tools, or a combination of software and hardware tools.

Figure 9:
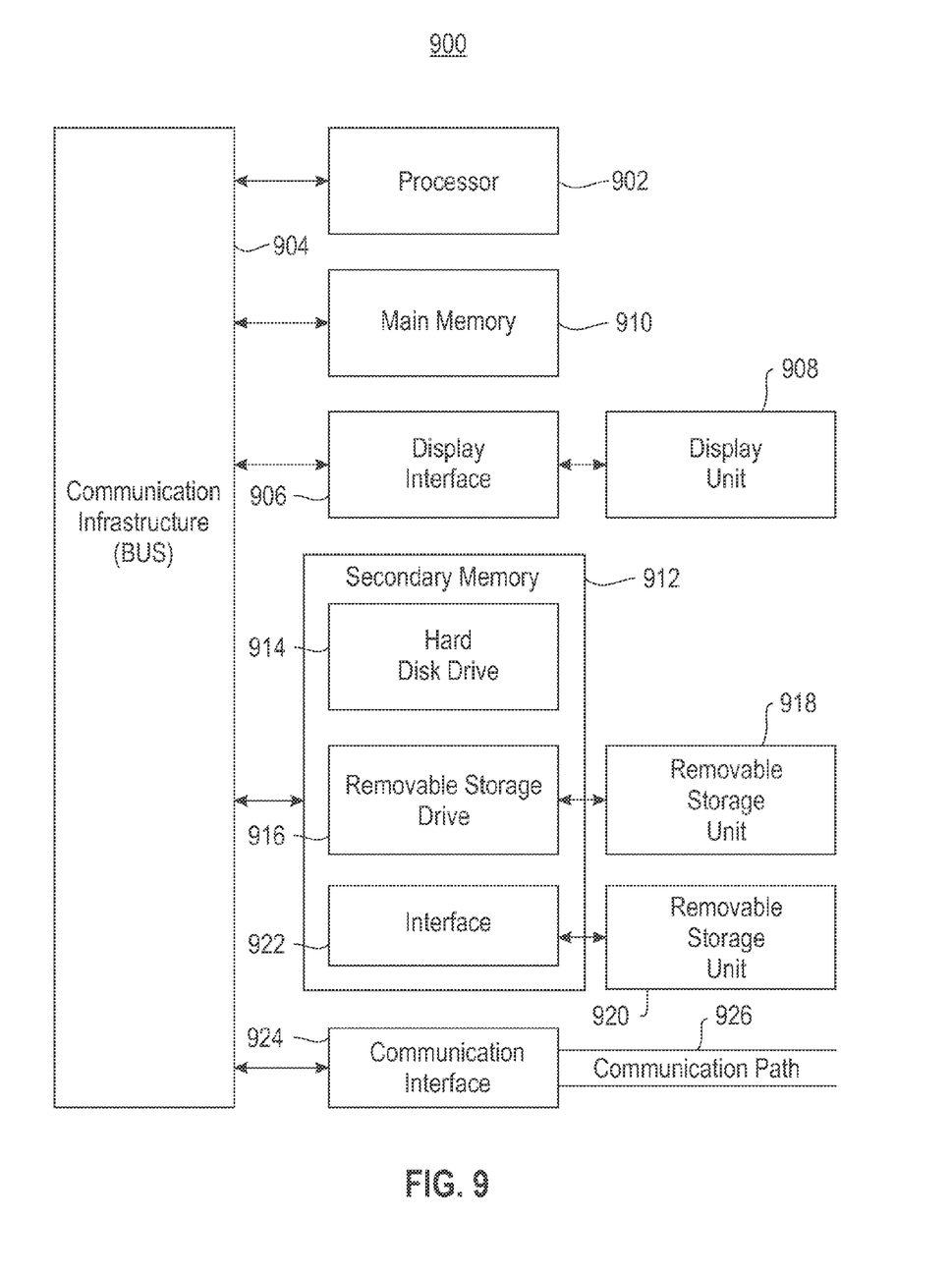
FIG. 9 depicts a block diagram showing a system for implementing an embodiment of the present invention.

Referring now to the block diagram of FIG. 9, additional details are now described with respect to implementing an embodiment of the present invention. The computer system includes one or more processors, such as a processor (902). The processor (902) is connected to a communication infrastructure (904) (e.g., a communications bus, cross-over bar, or network).

The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by removable storage drive (916). As will be appreciated, the removable storage unit (918) includes a computer readable medium having stored therein computer software and/or data.

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) is in the form of signals which may be, for example, electronic, electromagnetic, optical, or other signals capable of being received by communications interface (924). These signals are provided to communications interface (924) via a communications path (i.e., channel) (926). This communications path (926) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive (914).

Computer programs (also called computer control logic) are stored in main memory (910) and/or secondary memory (912). Computer programs may also be received via a communication interface (924). Such computer programs, when run, enable the computer system to perform the features of the present invention as discussed herein. In particular, the computer programs, when run, enable the processor (902) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

ALTERNATIVE EMBODIMENT(S)

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A computer program product for allocating storage space, the computer program product comprising a computer readable storage medium having program code embodied therewith, the program code being executable by a processor to:
   maintain a map for tracking status of data blocks within a data storage system, each block having a status value in the map, the status value selected from the group consisting of: used, free, and claimed free, wherein a used block is a block with stored data and claimed space, a free block is an unused block without claimed space, and a claimed free block is an unused block with claimed space; and
   satisfy a write transaction requiring one or more blocks, including the program code when executed by the processor to:
      search the map for a block to satisfy the transaction, the search including one or more blocks selected from the group consisting of: claimed free, free, and combinations thereof;
      satisfy the write transaction with a block having the status value selected from the group consisting of: claimed free and free, including the processor to prioritize selection of the block with a prioritized selection satisfied with one or more available claimed free blocks, and a secondary selection satisfied with one or more free blocks; and
      changing the status value of the selected blocks to used following selection of the one or more blocks.

2. The computer program product of claim 1, further comprising program code to reclaim a claimed free block, including identifying the claimed free block and changing the status value of the identified block to free.

3. The computer program product of claim 1, further comprising program code to, in response to the status of a block in a data partition changing from free to used, change the status of all other free blocks within the partition to claimed free.

4. The computer program product of claim 1, further comprising program code to reclaim a partition in response to detecting that all blocks in the partition have the status value claimed free, including program code to reclaim all the blocks within the partition and to change the status value of all claimed free blocks in the partition to free.

5. The computer program product of claim 1, further comprising program code to create an index of partitions to track a quantity of free blocks for each partition as represented in the index, and program code to prioritize selection of blocks from one of the partitions with a smallest quantity of claimed free blocks.

6. The computer program product of claim 1, further comprising program code to de-fragment a partition, including moving blocks between two or more partitions having both at least one claimed free block and at least one used block, wherein the de-fragment code minimizes a total number of partitions having both a claimed free block and a used block.

7. A system comprising:
   a processing unit in communication with data storage, and in communication with a map;
   a functional unit in communication with memory and a processing unit, the functional unit having tools to support data classification, the tools comprising:
      a maintenance manager to maintain the map to track a status value of data blocks within a data storage system, the status value selected from the group consisting of: used, free, and claimed free, wherein a used block is a block with stored data and claimed space, a free block is an unused block without claimed space, and a claimed free block is an unused block with claimed space; and
      a transaction manager in communication with the maintenance manager, the transaction manager to satisfy a write transaction requiring one or more blocks including:
         searching the map for a block to satisfy the transaction, the search including one or more blocks selected from the group consisting of:
         claimed free, free, and combinations thereof;
            selecting one or more blocks from the searched map, including prioritizing selection of the block with a primary selection satisfied with one or more claimed free blocks, and a secondary selection satisfied with one or more free blocks; and
            changing the status vale of the selected blocks to used following selection the one or more blocks.

8. The system of claim 7, further comprising a reclamation manager to reclaim a claimed free block, including the reclamation manager to identify the claimed free block, inform a storage controller to reclaim the identified block, and change the status value of the identified block to free.

9. The system of claim 7, further comprising the maintenance manager to, in response to the status of a block in a data partition changing from free to used, change the status of all other free blocks within the partition to claimed free.

10. The system of claim 7, further comprising a reclamation manager in communication with the maintenance manager, the reclamation manager to reclaim a partition after detecting that all blocks in the partition have the status value claimed free, wherein reclaiming the partition comprises informing a storage controller to reclaim all the blocks within the partition and to change the status value of all claimed free blocks in the partition to free.

11. The system of claim 7, further comprising the functional unit to optimize allocation of a partition, including the maintenance manager to create an index of partitions to track a quantity of free blocks for each partition as represented in the index, and the transaction manager to prioritize selection of blocks from one of the partitions with the smallest quantity of claimed free blocks.

12. The system of claim 7, further comprising a de-fragment manager to de-fragment a partition, including movement of blocks between two or more partitions having both at least one claimed free block and at least one used block, wherein the de-fragmentation minimizes a total number of partitions having both a used block and a claimed free block.

* * * * *